F. I. SIELING.
GAGING MACHINE.
APPLICATION FILED NOV. 3, 1908.

1,041,892.

Patented Oct. 22, 1912.

2 SHEETS—SHEET 1.

WITNESSES:
Robt R Kitchel
K. M. Milligan

INVENTOR
Frank I. Sieling
BY
Augustus B. Stoughton
ATTORNEY.

F. I. SIELING.
GAGING MACHINE.
APPLICATION FILED NOV. 3, 1908.

1,041,892.

Patented Oct. 22, 1912.

2 SHEETS—SHEET 2.

WITNESSES:

INVENTOR
Frank I. Sieling
BY
Augustus B. Stoughton
ATTORNEY.

UNITED STATES PATENT OFFICE.

FRANK I. SIELING, OF PHILADELPHIA, PENNSYLVANIA, ASSIGNOR TO THE STANDARD ROLLER BEARING COMPANY, OF PHILADELPHIA, PENNSYLVANIA, A CORPORATION OF NEW JERSEY.

GAGING-MACHINE.

1,041,892.

Specification of Letters Patent.    Patented Oct. 22, 1912.

Application filed November 3, 1908. Serial No. 460,924.

*To all whom it may concern:*

Be it known that I, FRANK I. SIELING, a citizen of the United States, and a resident of Philadelphia, in the county of Philadelphia and State of Pennsylvania, have invented a certain new and useful Gaging-Machine, of which the following is a specification.

The object of the present invention is to accurately gage balls and sort out those of approximately the same sizes, to hasten the operation of gaging and sorting the balls, and in the gaging operation to compensate for any slight deviation from true sphericity.

Figure 2:
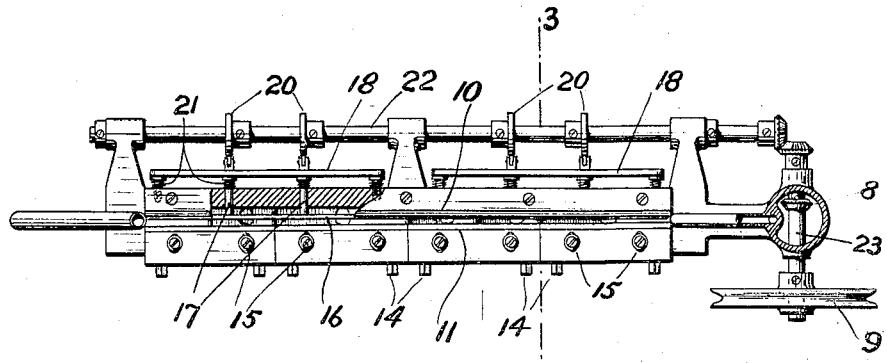
Figure 1:
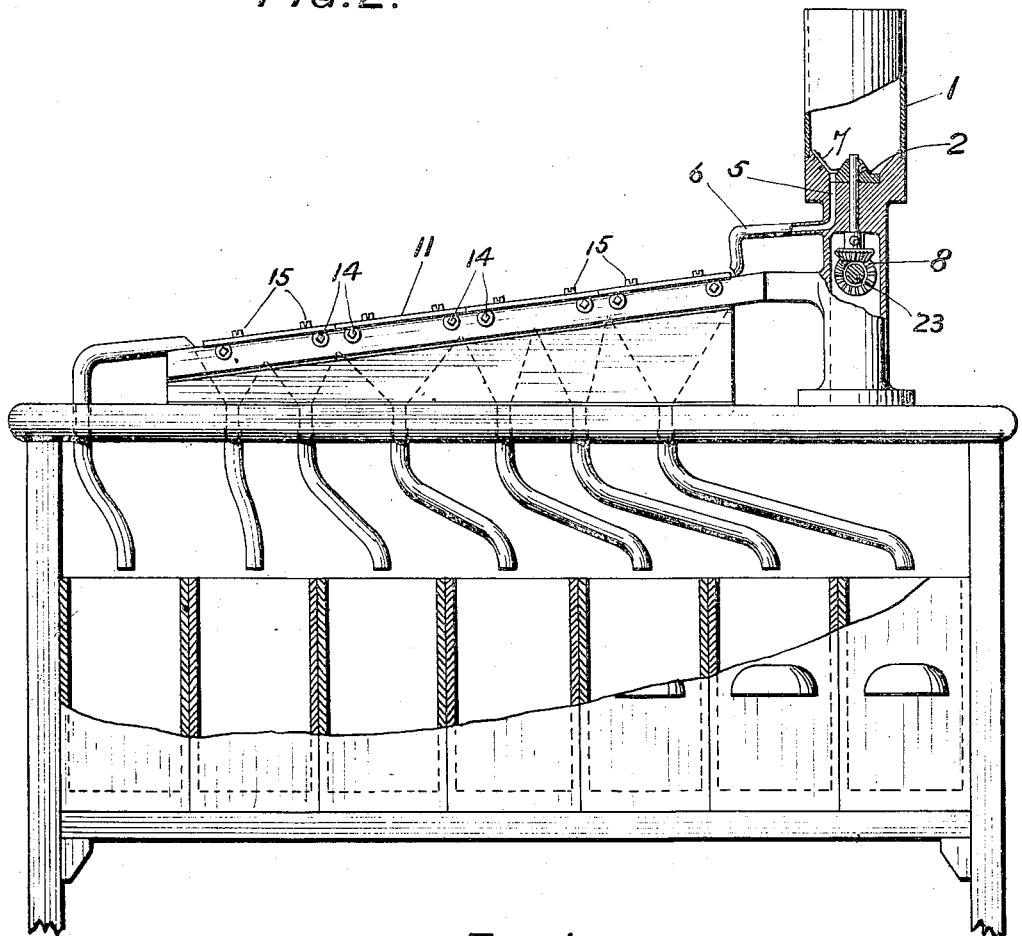
Figure 3:
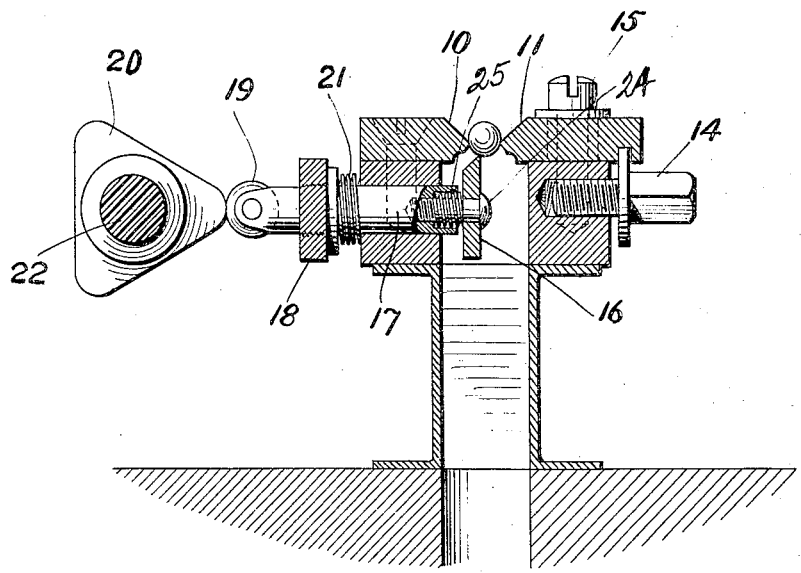
Figure 4:
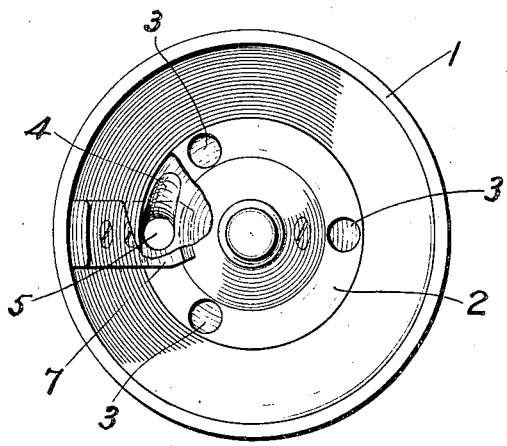

In the drawings, Figure 1, is a side view partly in section illustrating a machine embodying features of the invention. Fig. 2, is a plan view, with parts broken away, of the mechanism which is mounted on the table of the machine. Fig. 3, is a cross sectional view, drawn to an enlarged scale and taken on the line 3—3 of Fig. 2, and Fig. 4, is an enlarged plan view of the hopper with parts broken away.

In the drawings 1, is a hopper which receives the balls to be gaged and sorted. At the base of the hopper there is mounted a revolving plate 2, provided with holes 3, extending clear through it, and normally overlying the bottom of the hopper. The holes 3, are as to size, each adapted to accommodate a single ball. As the plate 2, rotates the balls which are carried in its openings 3, are one at a time brought first to the inclined entrance 4 of a hole 5 that communicates with the feeding tube 6, and thereafter carried under the guard plate 7, and deposited through the opening 5 in the tube 6. The plate 2, is shown as rotated by means of beveled gears 8, driven by a pulley 9. The tube 6, toward the discharge end thereof is suitably bent; in the present instance, downward so as to check the velocity of the balls in order that they may not be delivered with too much momentum. From the tube 6, the balls are delivered upon inclined ways 10 and 11, the edges of which are somewhat divergent from the tube 6, so that as the balls travel along the divergent ways, thus approximating certain sizes drop and pass between the ways at different distances along the same and those approximating the same sizes are led by the wide-mouthed delivery tubes to separate compartments, each of which therefore receives balls of substantially the same size but differing in size from the balls of the other compartments. One of the ways as 11, is made in sections, each section being adjustable by means of adjusting screws 14 and capable of being clamped to place when adjusted by means of clamping screws 15. The other way 10, is fixed. There is an agitator 16, shown to consist of a bar provided with a knife edge, arranged beneath and between the ways 10 and 11, and movable crosswise thereof, so as to be in range of the balls which are gravitating along the same. This agitator has spring connection with pins 17, movable endwise, which in turn are connected with a bar 18, having rollers 19, operated upon by cams 20. There are springs 21, which hold the rollers 19 up to their cams. The cams are mounted on a shaft 22, driven from the shaft 23, which carries one of the miter gears 8. This constitutes one, but not the only mechanism for operating the agitators, the construction of which is not necessarily limited to that above referred to. The function of the agitator is to impart to the balls a motion of rotation about their own centers and thus should any of them be elliptical they are nevertheless properly gaged and sorted, furthermore its action controls the travel of balls and thus insures accuracy in the gaging operation.

The pins 17 are provided with headed studs 24, on the shanks of which the agitators 16, are movable. The springs 25, serve to keep the agitators normally up against the heads of the studs 24.

What I claim is:

1. In a ball gaging and sorting machine the combination of inclined ways having their edges receding in respect to each other and along which balls roll and between which they pass, an agitator bar having a straight edge and arranged beneath the ways, and means for reciprocating the agitator sidewise and in a horizontal plane below the opening in the ways to wipe the balls and turn them crosswise of the ways.

2. In a ball gaging and sorting machine the combination of inclined ways having their edges receding in respect to each other and along which balls roll and between which they pass, an agitator bar having a straight edge and arranged beneath the ways, and means including spring connections for reciprocating the agitator sidewise and in a horizontal plane below the opening in the ways to wipe the balls and turn them crosswise of the ways.

3. In a ball gaging and sorting machine in combination with the ways along and between which balls pass, an agitator bar having a straight edge and arranged beneath the ways and movable in a horizontal plane transversely thereof, a bar provided with pins and having spring connection interposed between it and the agitator bar, and means for oscillating the second mentioned bar, substantially as described.

4. In a ball gaging and sorting machine, the combination with the ways along and between which balls pass, of an agitator bar arranged beneath the ways and movable transversely thereof, a bar provided with pins and rollers, cams coöperating with the rollers, and springs for holding the rollers up to the cams, substantially as described.

In testimony whereof I have hereunto signed my name.

FRANK I. SIELING.

In presence of—
CLIFFORD K. CASSEL,
FRANK E. FRENCH.